United States Patent [19]
Houston

[11] 4,066,062
[45] Jan. 3, 1978

[54] SOLAR HEATING SYSTEM

[76] Inventor: Elmer Houston, 2437 NW. 11th St., Oklahoma City, Okla. 73107

[21] Appl. No.: 626,455

[22] Filed: Oct. 28, 1975

[51] Int. Cl.² ............................................. F24J 3/02
[52] U.S. Cl. .................................. 126/271; 126/270; 237/1 A
[58] Field of Search ............... 126/271, 270; 237/1 A; 165/170; 60/641

[56] References Cited

U.S. PATENT DOCUMENTS

| | | | |
|---|---|---|---|
| 567,618 | 9/1896 | Severy | 126/270 |
| 991,161 | 5/1911 | McHenry | 237/1 A |
| 1,658,455 | 2/1928 | Metzech et al. | 126/271 |
| 1,673,429 | 6/1928 | Vinson | 126/271 |
| 1,888,620 | 11/1932 | Clark | 126/271 |
| 2,382,722 | 8/1945 | Kezer | 126/271 |
| 2,902,028 | 9/1959 | Manly | 126/271 |
| 3,239,000 | 3/1966 | Meagher | 126/271 X |
| 3,929,121 | 12/1975 | Rogers | 237/1 A |
| 3,957,109 | 5/1976 | Worthington | 126/270 X |

FOREIGN PATENT DOCUMENTS 272,027    7/1965    Australia ............................. 126/271

Primary Examiner—William F. O'Dea
Assistant Examiner—Larry Jones
Attorney, Agent, or Firm—J. Wesley Everett

[57] ABSTRACT

The present invention relates to an improved apparatus for utilizing the head from the sun's rays as a source of energy for heating a liquid which may be stored and/or circulated through a heating system for heating homes or other areas by providing a plurality of individually adjustable lenses divided into groups, each group adapted to focus the sun's rays on a heat absorbing member at consecutive periods during the daylight hours as the sun changes its position.

2 Claims, 9 Drawing Figures

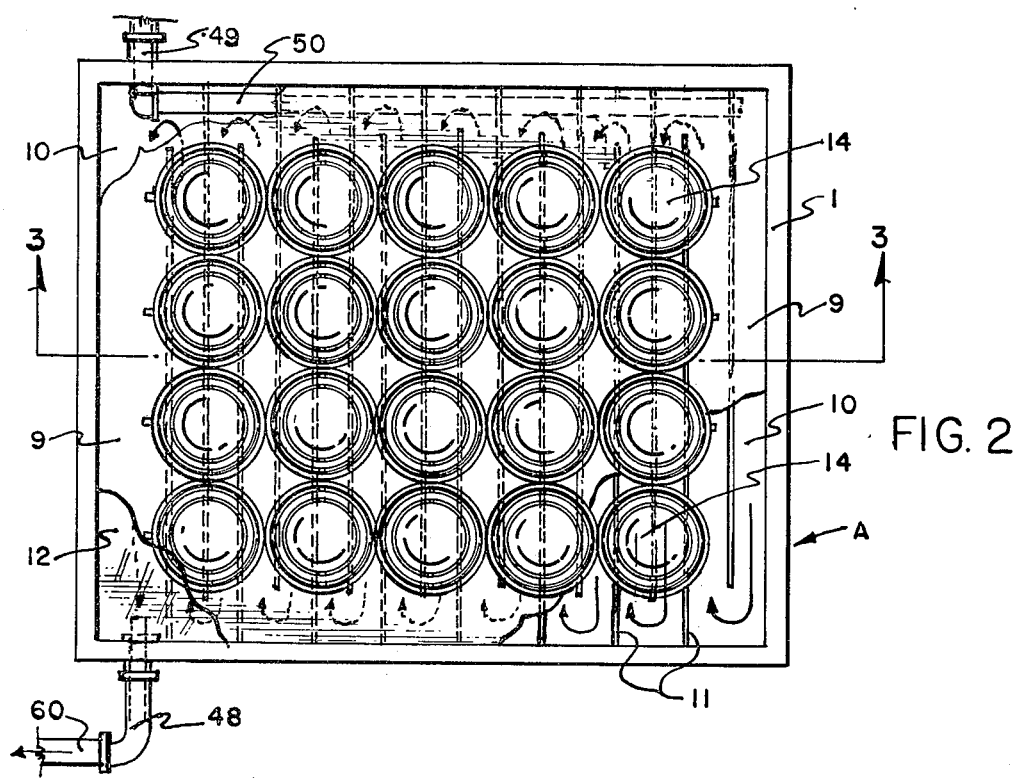
FIG. 2
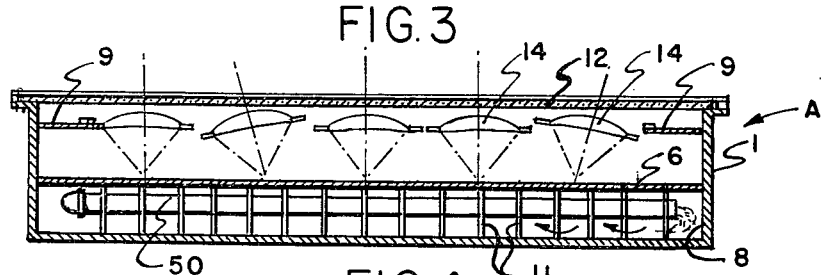
FIG. 3
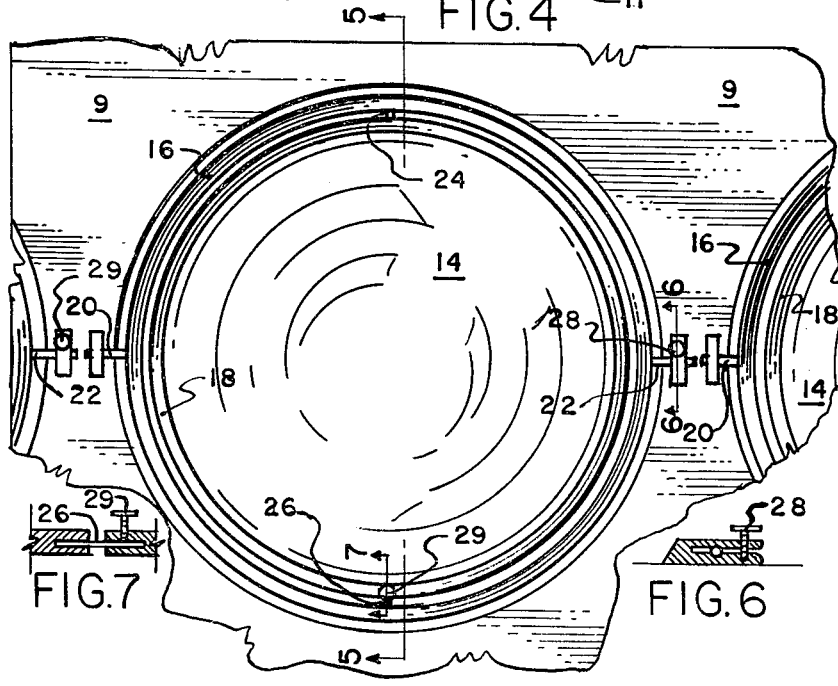
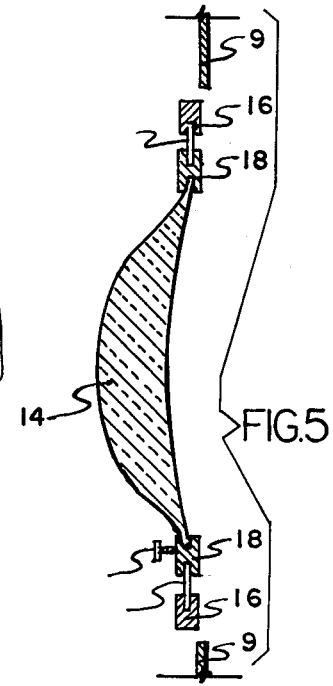
FIG. 4
FIG. 7
FIG. 6
FIG. 5

SOLAR HEATING SYSTEM

The invention relates to an improved apparatus that is designed to obtain the maximum energy from the sun's rays.

One object of the invention is to provide an apparatus that requires minimum adjustment to the sun's position.

Another object of the invention is to provide an apparatus having a more efficient heat exchange unit by equipping the same with a plurality of individual adjustable lenses.

A further object of the invention is to provide an apparatus that is simple in construction and operation.

While several objects of the invention have been set forth other objects, uses and advantages will become more apparent as the nature of the invention is more fully disclosed in the following description with reference to the accompanying drawings, in which:

FIG. 2 is a top plan view of the heat exchange unit having a part broken away to show part of the interior thereof.

FIG. 3 is a sectional view of the heat exchange unit taken on line 3—3 of FIG. 2.

FIG. 4 is a top plan view of one of the lenses.

FIG. 5 is a sectional view taken along line 5—5 of FIG. 4.

FIG. 6 is a sectional view taken along line 6—6 of FIG. 4.

FIG. 7 is a sectional view taken along line 7—7 of FIG. 4.

Figure 1:
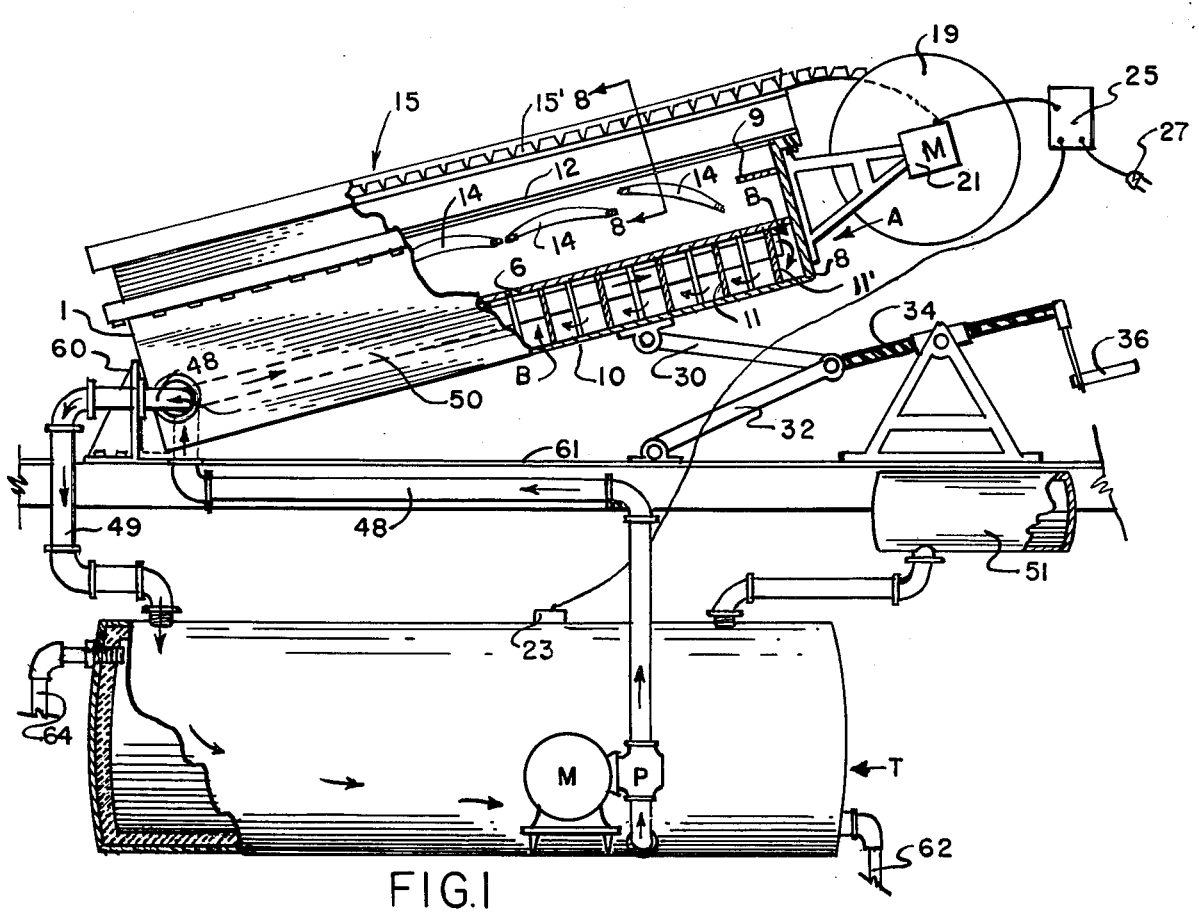
FIG. 1 is a view of the apparatus partly in elevation and partly in section.
Figures 8, 9:
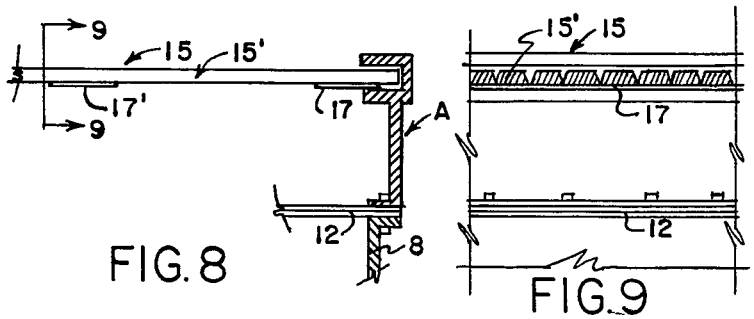
FIG. 8 is a sectional view taken on line 8—8 of FIG. 1.
FIG. 9 is a sectional view taken along line 9—9 of FIG. 8.

The apparatus comprises in general a heat exchange unit A, a liquid storage tank T, a pump P for circulating the liquid through the heat exchange unit and a plurality of individually adjustable lenses adapted to focus the sun's rays on a heat conductor element.

The heat exchange unit is provided with a suitable frame 1. Within the frame 1 is a liquid-tight compartment B having a substantially heavy metallic upper plate 6, side walls 8, a bottom plate 10, and a plurality of baffles 11 extending between the top and bottom plates, the baffles are spaced apart to form channels therebetween for the flow of the liquid, every other baffle being spaced from one of the two side walls for allowing the circulating liquid to pass from one channel to the other.

Adjacent the upper side of the heat exchange unit A is a transparent cover member 12, extending over the entire area of the heat exchange unit. Below the cover 12 and spaced inwardly therefrom, is a lens-supporting plate 9 likewise covering the entire area of the heat exchange unit having a plurality of openings therein. Into each opening in the lens-supporting member 9 there is mounted a single adjustable lens 14.

The heat exchange unit may be closed to the sun's rays by an adjustable shade 15, preferably shown as having a plurality of slats 15', secured to belt members 17 and 17', which will be later referred to.

Each lens is adjustable in any direction to a limited degree without changing to any great extent its position relative to the distance from the upper plate 6 of the liquid-tight compartment B.

Each lens is supported by two rings 16 and 18. The ring 16 is supported on pins 20 and 22, which are bearinged on the plate 9, and on a line passing through the center of the ring. The ring 18 is supported on pins 24 and 26 bearinged on ring 16 at points 90° from the pins 20 and 22. With this arrangement it will be seen that each lens is individually adjustable to any number of positions to focus the sun's rays on the plate 6. When the lens has been adjusted to a selected position, the rings may be secured in such adjusted positions by the thumb screws 28 and 29 clamping the ring supports as shown in FIGS. 6 and 7.

The object of the individually adjustable lens is to be able to adjust several groups of lenses out of the total number of lenses that will focus the sun's rays at some point on the plate 6 at different time periods. For example, a selected number of lenses such as five of the present number of twenty, would be directed to focus the sun's rays from 9 to 11 A.M. on the plate 6 and another five lenses would be adjustable to direct the sun's rays on the plate 6 from 11 A.M. to 1 P.M. after which another five lenses would be adjusted to focus the sun's rays on the plate 6 from 1:00 P.M. until 3:00 P.M. and the last five lenses are adjusted to focus the sun's rays on the plate 6 from 3:00 P.M. until 5:00 P.M. With this arrangement the heat from one of the four groups will be focused on the plate 6 from 9:00 A.M. until 5:00 P.M. which is the most desirable period during the day for utilizing the sun's rays.

The plate 6 being of metal, is a good conductor of heat and will distribute the heat from the focus point of each lens to a substantial area of the plate 6, thereby heating the liquid carried within the liquid-tight compartment.

As the seasons change the heat exchange unit is adjustable to the change in the angle of the sun's rays by the arms 30 and 32, which are adjustable by the threaded screws 34 operated by the handle 36, which will tilt the heat exchange unit in order that the lenses will be perpendicular to the path of the sun.

The shading means 15 for the heat exchange unit is carried within a drum 19 operatable by a motor 21 through an appropriate gear chain (not shown). The direction in which the motor 21 rotates is controlled by a thermostat 23, carried on the fluid supply tank T. The thermostat is connected to a control unit housed in a box 25 which controls the electric current to the motor received from an electric supply 27. When the thermostat calls for the shade 15 to be placed over the heat exchange unit, the motor 21 will operate in one direction and when the shade is to be removed, the motor 21 is operatable in the opposite direction.

One end of the said heat exchange unit A is pivoted on the ends of the pipes 48 and 49 respectively which are supported on the bracket 60. The apparatus may be supported on a roof 61 of a building or any other suitable place. The heat exchange unit is mounted at an angle which presents the upper surface of the heat exchange unit in the direction of the sun's rays.

There is also provided an expansion tank 51 for keeping the storage tank filled with the liquid.

The liquid used in the system may be that which is most suitable for the particular operation, such as water, oil, chemical solutions, etc.

There is further provided an inlet 62 to the storage tank T and an outlet 64 for circulating the fluid to its source of use.

The general operation of the apparatus is that the liquid from the bottom of the liquid supply tank T is forced by the pump P through the pipes 48 and 50 to the liquid-tight compartment B of the heat exchange unit 1 to the channel beyond the top of the uppermost baffle 11. The liquid then moves down through each of the channels 11 to the bottom of the liquid-tight compartment B and out through the pipe 49 to the storage tank T.

The flow of liquid through the heat exchange unit is controlled by the volume of liquid allowed to pass through the pump P.

While the invention has been shown and described in its simple form, it is not intended as a limitation as the scope of the invention is best shown in the appended claims.

I claim:

1. In an improved apparatus for heating a liquid supply by collecting heat from the sun's rays, in combination:
  a. an angle mounted flat heat exchange unit having an upper end and a lower end, and a liquid intake at its upper end and a liquid outlet at its lower end, said heat exchange unit having a liquid-tight compartment associated therewith, said liquid-tight compartment comprising a fixed upper plate and a fixed bottom plate, said bottom plate being spaced outwardly from the upper plate, lateral baffles within the area between the top and bottom plates forming channels to guide a liquid laterally from side to side of the heat exchange liquid-tight compartment throughout the area of the liquid-tight compartment from its intake end to its outlet end;
  b. a tank for storing the said liquid supply and means for connecting the liquid supply tank with the liquid-tight compartment through fixed conduits connected to said tank including means for pivotally connecting said conduits to the liquid-tight compartment of the heat exchange unit;
  c. means for circulating the liquid in the liquid supply tank and the liquid-tight compartment of the heat exchange unit for heating said liquid;
  d. said heating apparatus comprising a plurality of individual universally adjustable lenses mounted upon a lens-supporting plate, said plate being mounted above the upper plate of the heat exchanger unit at a distance to focus the sun's rays through the said lenses on the upper plate of the heat exchange unit, said lenses being formed in groups, wherein each group of lenses is adjusted to concentrate the sun'rays at different time periods as the angle of the sun's rays change relative to the upper surface of the upper plate of heat exchange unit;
  e. supporting means for each of said lenses comprising, a first supporting means fixed to said lenses and diametrically attached thereto, a second lens-supporting member diametrically attached to the lens-supporting plate at 90° from the attachment of the first lens-supporting member to the second lens-support and means for securing each of the first and second lens-supporting members in adjusted position.

2. In a heat exhange unit as claimed in claim 1 wherein the pivot means is positioned at each side and at one end of the heat exchange unit on the fluid intake and outlet conduits to the heat exchange units, including means for adjusting the opposite end of the heat exchange unit relative to the said conduits.

* * * * *